United States Patent [19]
Rudolph

[11] Patent Number: 5,687,959
[45] Date of Patent: Nov. 18, 1997

[54] HYDRAULICALLY DAMPING RUBBER BEARING

[75] Inventor: Axel Rudolph, Bensheim, Germany

[73] Assignee: Firma Carl Freudenberg, Weinheim, Germany

[21] Appl. No.: 636,357

[22] Filed: Apr. 23, 1996

[30] Foreign Application Priority Data

Apr. 29, 1995 [DE] Germany ................ 195 15 838.5

[51] Int. Cl.$^6$ ................................. F16F 13/00
[52] U.S. Cl. .................... 267/140.12; 267/141.4
[58] Field of Search ................... 267/140.11, 140.12, 267/140.13, 141.2, 141.3, 141.4, 141.5, 293, 35, 219; 180/300, 312; 248/562, 636, 550

[56] References Cited

U.S. PATENT DOCUMENTS

| | | | |
|---|---|---|---|
| 4,583,503 | 4/1986 | Kumagai et al. | 123/192 R |
| 4,699,099 | 10/1987 | Arai et al. | 123/192 R |
| 4,709,779 | 12/1987 | Takehara | 180/300 |
| 4,767,107 | 8/1988 | Le Fol | 267/141.4 X |
| 4,832,319 | 5/1989 | Noguchi et al. | 267/140 |
| 4,867,263 | 9/1989 | Sugino et al. | 180/291 |
| 4,872,652 | 10/1989 | Rohner et al. | 267/140 |
| 5,005,810 | 4/1991 | Sawada et al. | 267/140.12 |
| 5,040,775 | 8/1991 | Miyakawa | 267/220 |
| 5,172,893 | 12/1992 | Bouhier et al. | 267/140.12 |
| 5,195,728 | 3/1993 | Skipper | 267/141.3 X |
| 5,356,122 | 10/1994 | Freudenberg | 267/140.13 |
| 5,474,284 | 12/1995 | Hamaekers et al. | 267/220 |

FOREIGN PATENT DOCUMENTS

| | | |
|---|---|---|
| 3710629 | 3/1987 | Germany . |
| 3823238 | 2/1989 | Germany . |
| 59-194141 | 2/1984 | Japan . |
| 59-93537 | 5/1984 | Japan . |
| 60-166509 | 8/1985 | Japan . |
| 61-146628 | 7/1986 | Japan . |
| 64-35138 | 2/1989 | Japan ................ 267/140.12 |
| 2-245537 | 10/1990 | Japan ................ 267/140.12 |
| 4-362332 | 12/1992 | Japan ................ 267/140.11 |

OTHER PUBLICATIONS

"Theory of the Hydro-Bearing," Spurk/Andra, *Automobile Industry*, May 1985.

*Primary Examiner*—Peter M. Poon
*Attorney, Agent, or Firm*—Kenyon & Kenyon

[57] ABSTRACT

A hydraulically damping rubber bearing comprising an inner supporting body surrounded with radial clearance by an outer supporting body. The inner and the outer supporting bodies are joined together by a resilient elastomeric element forming the boundary of a working chamber filled with damping fluid. The working chamber is separated from a compensating chamber by a separating wall having at least one duct-shaped opening and is connected to the compensating chamber in a manner such that it is in fluid communication with it. The compensating chamber is sealed on the side facing away from the separating wall by a compensating membrane. The separating wall has a centrally arranged opening which surrounds the inner supporting body with radial clearance, the annular gap formed by the clearance being designed as a damping duct. The separating wall also has at least one window filled in by a window membrane made of elastomeric material to isolate higher frequency vibrations.

12 Claims, 4 Drawing Sheets

HYDRAULICALLY DAMPING RUBBER BEARING

BACKGROUND OF THE INVENTION

The invention relates to a hydraulically damping rubber bearing comprising an inner supporting body which is surrounded with radial clearance by an outer supporting body. The inner and the outer supporting bodies are joined together by a resilient elastomeric element. The rubber bearing has a working chamber filled with damping fluid, and a compensating chamber separated from the working chamber by a separating wall. The separating wall has at least one duct-shaped opening connecting the working chamber to the compensating chamber in a manner such that they are in fluid communication with each other. The compensating chamber is sealed on the side facing away from the separating wall by a compensating membrane accommodating an increase in the volume of fluid in the compensating chamber essentially without pressure.

Such hydraulically damping rubber bearings are generally known. For example, a rubber bearing designed as a sleeve with the resilient element arranged between the inner and the outer supporting bodies is known in the art. Such previously known rubber bearings are typically suitable in damping vibrations introduced in the radial direction. The damping action is derived from the mass of the damping fluid reciprocating within the duct-shaped opening, the geometry of the duct-shaped opening having an important influence on the frequency range in which the vibrations are to be damped.

SUMMARY OF THE INVENTION

An object of the invention is to develop a rubber bearing such that lower frequency vibrations in a frequency range of 4 to 80 Hz introduced in the axial direction can be damped. A further object of the invention is to develop a rubber bearing such that the dynamic spring rate is lowered in the higher frequency ranges, for the isolation of higher frequency vibrations.

For achieving these objectives, in accordance with an embodiment of the present invention, the separating wall of the rubber bearing is constructed with a centrally arranged opening which surrounds the inner supporting body with radial clearance. The clearance results in an annular gap between the inner supporting body and the separating wall which acts as a damping duct. The separating wall further comprises at least one window filled in by a window membrane made of elastomeric material.

In a rubber bearing constructed in this manner, the length of the damping duct in the axial direction serves to damp higher amplitude, lower frequency vibrations, while the window membrane(s) which covers the window serves to isolate smaller amplitude, higher frequency vibrations. (Because of the comparatively high mass inertia of the fluid, fluid displacement does not take place within the damping duct during the vibration isolation of smaller amplitude, higher frequency vibrations.) A rubber bearing constructed with these features is formed of a simple construction and can be produced simply and cost-effectively.

Different vibration characteristics of structural elements to be damped can be taken into account without difficulty by utilizing different embodiments of the separating wall. The wall can be designed such that the damping duct formed by the clearance between the wall and the inner supporting body damps low frequency vibrations in the range of 4 to 80 Hz. Additionally, the number and distribution of the windows, and the size and the flexibility of the window membranes, may be adapted to the conditions of the particular application in order to attain a vibration damping/vibration isolation which is as broad as possible.

In accordance with an embodiment of the invention, the separating wall may be joined relatively immovably to the outer supporting body. This insures that a relative displacement takes place only between the separating wall and the inner supporting body, not between the separating wall and the outer supporting body.

When relative displacement takes place between the separating wall and the inner supporting body, a fluid displacement takes place in the region of the window membrane, thereby causing it to expand and contract. The transient condition of this membrane, which acts as the spring of a spring-mass system in which the fluid is the mass, results in this fluid mass oscillating out-of-phase to the introduction of force. This thereby reduces the dynamic spring rate.

In accordance with an embodiment of the invention, the separating wall may be comprised of a metallic material that is deformable without the need to cut the material. Such a construction has cost advantages from a production standpoint.

The separating wall may be completely sheathed by elastomeric material, the elastomeric sheath and the window membrane being configured integrally and continuously with one another. This insures that the elastomeric components are reliably held to the metallic material of the separating wall. This also reduces unwanted impact noises in the event of striking contacts of the separating wall on the inner supporting body during movements of the rubber bearing in the radial and axial direction.

The separating wall may have a substantially cylindrical portion bordering the opening that is constructed as an axial projection. The axial projection acts as a radial stop mechanism to restrict extreme radial excursion movements of the inner and outer supporting bodies relative to one another. For example if, in addition to and/or alternatively to the vibrations usually introduced in the axial direction, there is a radial displacement of the inner supporting body relative to the outer supporting body, the inner supporting body moves toward the side of the separating wall bordering the opening until there is a striking contact. In this manner, extreme movements, as well as an overstretching of the rubber elastic materials, are avoided. Thus, the rubber bearing is more durable.

The separating wall may have one or more relatively loose boundary elements which are movable back and forth to isolate higher frequency vibrations. The boundary elements may have a cross-sectional configuration that is substantially double-T-shaped and may be snapped into corresponding apertures in the separating wall. Due to the oscillatory play which is permitted of the boundary elements in the apertures, the range of higher frequency vibrations which can be isolated is improved. A plurality of boundary elements comprised, for example, of polymer material, may be distributed uniformly in the circumferential direction. Due to their comparatively low weight, the boundary elements have a small mass inertia and respond quickly to isolate higher frequency vibrations. The boundary elements may be elastically prestressed as compared with the separating wall.

The separating wall may have one or more safety valves through which the damping fluid is able to flow in at least one direction. This helps avoid pressure peaks which, for example, develop in the event of a sudden axial displacement of the inner and outer supporting bodies relative to one another. A safety valve may be provided as a cut in the elastomeric material in one of the window membranes in the separating wall. In the event of an unacceptably high pressure difference between the working chamber and the compensating chamber, the cut allows additional fluid flow between the chambers in order to reduce the pressure peaks.

The separating wall may have an axial stop mechanism which may be brought into contact with a counter-stop mechanism of the inner supporting body extending in the radial direction. The counter-stop mechanism may be constructed as a spring deflection stop mechanism and may be arranged within the working chamber. Excessively high mechanical stresses of the resilient element and the window membrane are thereby reduced. Because the separating wall is preferably completely sheathed by elastomeric material, no impact noises come about when the axial stop mechanism strikes against the counter-stop mechanism. Moreover, due to the resilient nature of the sheath, a gradual and progressively damped contact occurs. The axial clearance between the counter-stop mechanism and the axial stop mechanism is dimensioned in such a way that contact does not occur during the normal use of the rubber bearing. Only in the event of excessive axial displacements of the inner supporting body relative to the outer supporting body do the two stop mechanisms contact one another.

The counter-stop mechanism may be configured integrally and continuously with the inner supporting body. In this case, the rubber bearing consists basically of only three structural elements made of tough material—the inner supporting body, the outer supporting body, and the separating wall tube—the three structural elements being secured in position and bound to one another by elastomeric material.

As an exemplary application of a rubber bearing according to the invention, the rubber bearing may be used as a suspension subframe bearing in a motor vehicle for the damping/isolating of vibrations introduced in the axial direction.

DETAILED DESCRIPTION OF THE DRAWINGS

Figure 1:
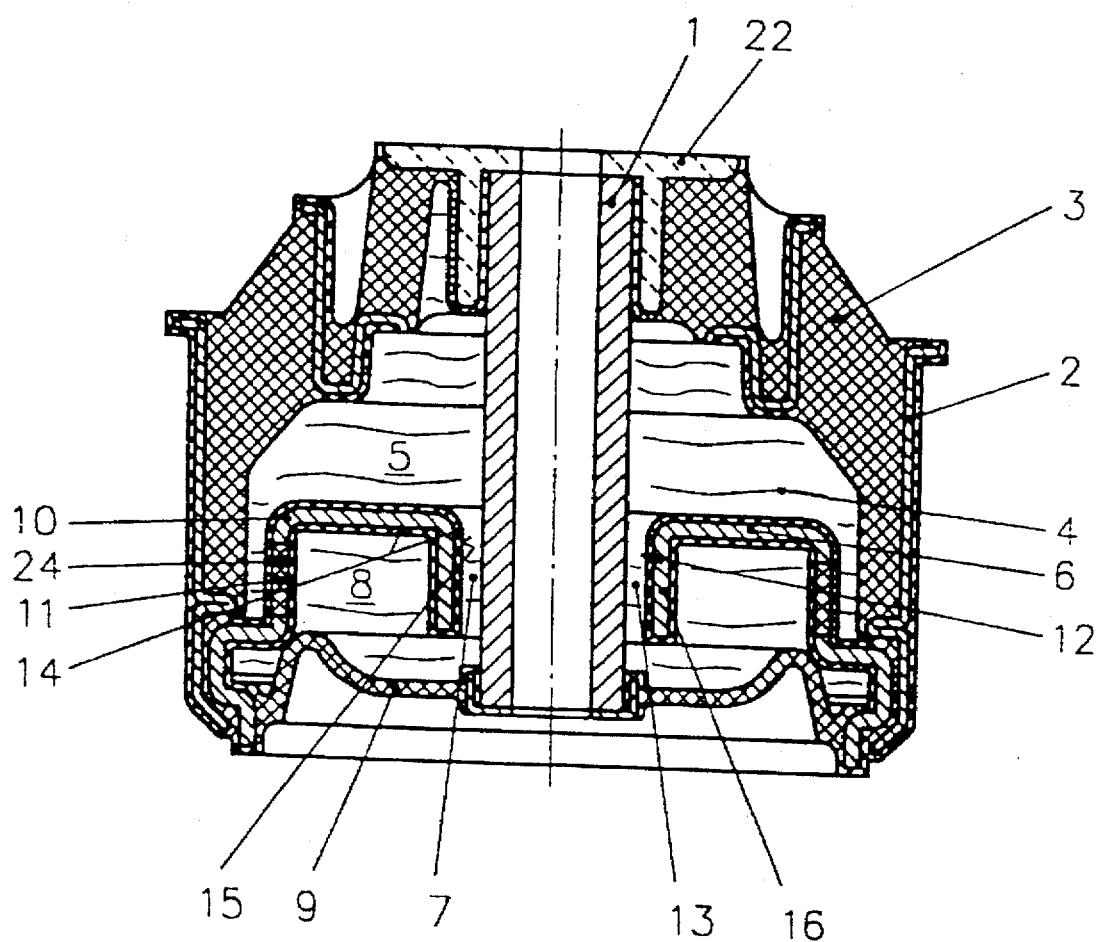
FIG. 1 shows a first embodiment in which the windows in the separating wall are each covered with membranes made of elastomeric material to isolate higher frequency vibrations.

FIGS. 1 through 4 show, in schematic representation, exemplary embodiments of hydraulically damping rubber bearings according to the invention. The rubber bearing comprises a cylindrical inner supporting body 1 and an outer supporting body 2. The inner supporting body 1 and the outer supporting body 2 are joined together by a resilient elastomeric element 3, which is positioned in the gap formed by the radial clearance between the inner and the outer supporting bodies 1, 2.

In the region of one end face of the inner supporting body 1, the resilient elastomeric element 3 is secured to the inner supporting body 1 by a holding plate 22 which embraces the end face of the inner supporting body 1. In the region of the other end face of the inner supporting body 1, the rubber bearing is bounded by an annular compensating membrane 9 which is adhesively joined on the inside in the radial direction to a clamping ring (not numbered) which is clamped onto the end of the inner supporting body 1 in a fluid-tight manner.

The compensating membrane 9 is joined on the outside in the radial direction to a separating wall 6, the radially outer boundary of the separating wall 6 being arranged in a fluid-tight manner within the outer supporting body 2. The separating wall 6 divides the interior space of the rubber bearing into a working chamber 5 and a compensating chamber 8. The separating wall 6 has an opening 7 which allows damping fluid 4 to flow between the working chamber 5 and the compensating chamber 8. The opening 7 is arranged centrally within the separating wall 6, the side of the separating wall 6 bordering the opening 7 surrounding the inner supporting body 1 with radial clearance, thereby resulting in an annular gap 12 forming a damping duct 13. The separating wall 6 may have an axial projection 16 for extending the length of the damping duct 13. When damping fluid 4 flows from the working chamber 5 to the compensating chamber 8 through the damping duct 13, the compensating membrane 9 allows a largely pressureless accommodation of damping fluid 4 in the compensating chamber 8.

In each of the four illustrated embodiments, the separating wall 6 comprises a one-piece component 10 which, in these examples, has four windows 11 distributed uniformly in the circumferential direction. The windows 11 are filled in by window membranes 24 made of elastomeric material. The window membranes 24 serve to isolate higher frequency vibrations, preferably frequencies greater than 80 Hz.

In each of the four illustrated embodiments, the separating wall 6 and the outer supporting body 2 are pressed together making a seal and are arranged in a manner such that they are substantially immovable relative to one other. The separating wall 6 is completely enclosed by a sheath 14 made of elastomeric material, the compensating membrane 9 and the sheath 14 being configured integrally and continuously with one another.

FIG. 1 shows a first embodiment of a rubber bearing according to the invention. The separating wall 6 consists of a sheet metal part that is deformable without the need to cut the metal and which is completely enclosed by the sheath 14 made of elastomeric material. The separating wall has an axial projection 16 with a side 15 which essentially cylindrically borders the opening 7.

Upon the introduction of forces into the rubber bearing which cause a radial movement of the inner supporting body 1 relative to the outer supporting body 2, the sheath 14 which borders the annular gap 12 positions itself in one partial area against the inner supporting body 1. In this manner the sheath 14 and the axial projection 16 which it covers act as a radial stop mechanism preventing an overstretching of the elastomeric materials of the resilient elastomeric element 3 and the compensating membrane 9.

With relative displacement between the inner supporting body 1 and the separating wall 6, a displacement of fluid takes place, causing the window membranes 24 to deform to accommodate the fluid displacement. The transient condition of the membranes 24 results in the fluid mass oscillating out-of-phase with respect to the force acting on the bearing, and the dynamic spring rate is thereby reduced.

Figure 2:
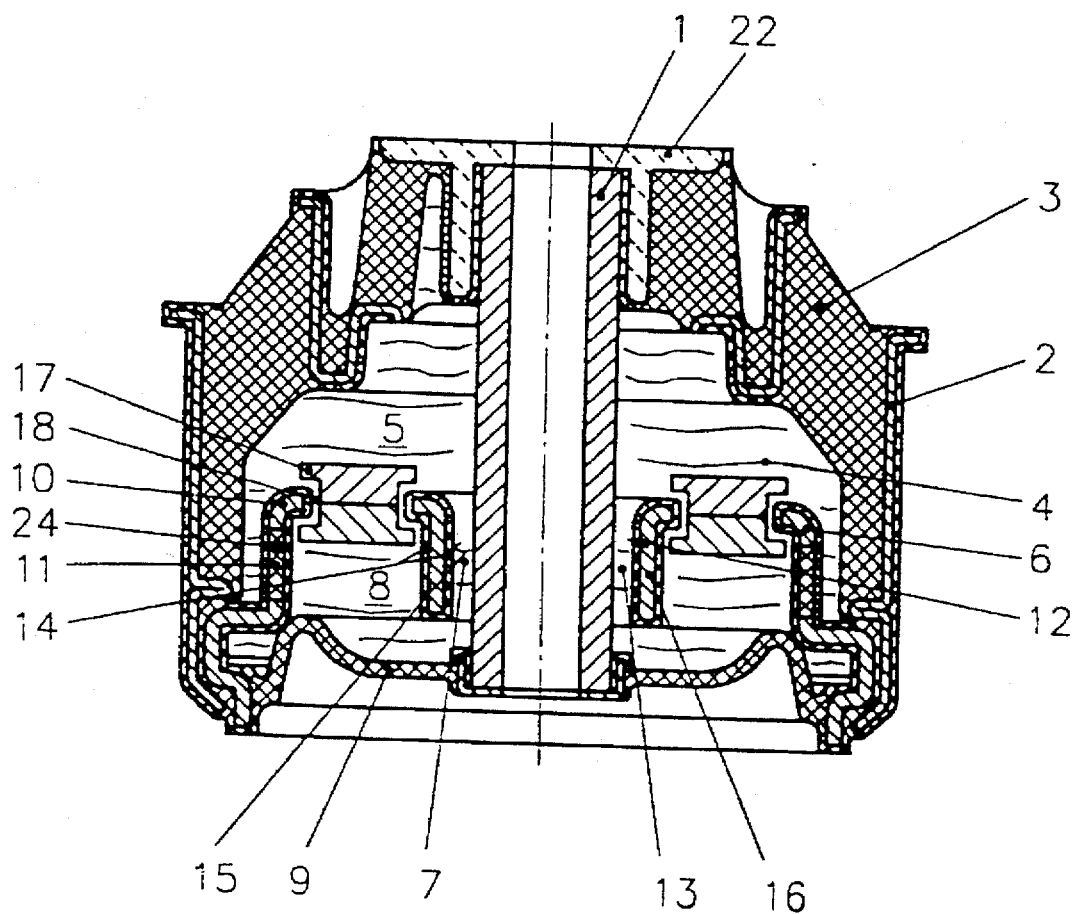
FIG. 2 shows a second embodiment in which loose boundary elements are further provided for the isolation of higher frequency vibrations, the boundary elements being arranged in apertures in the separating wall.

FIG. 2 shows a rubber bearing constructed similarly to the rubber bearing of FIG. 1. The embodiment of FIG. 2 differs from the embodiment of FIG. 1 in that, in addition to the windows 11 covered by the window membranes 24, the component 10 forming the separating wall 6 additionally has apertures 18 in which loose boundary elements 17 are snapped into place. Thus, in comparison with the embodiment of FIG. 1, the rubber bearing shown in FIG. 2 has an even broader-band vibration damping/isolation, since the loose boundary elements 17 are movable during the isolating of higher frequency, lower amplitude vibrations.

Figure 3:
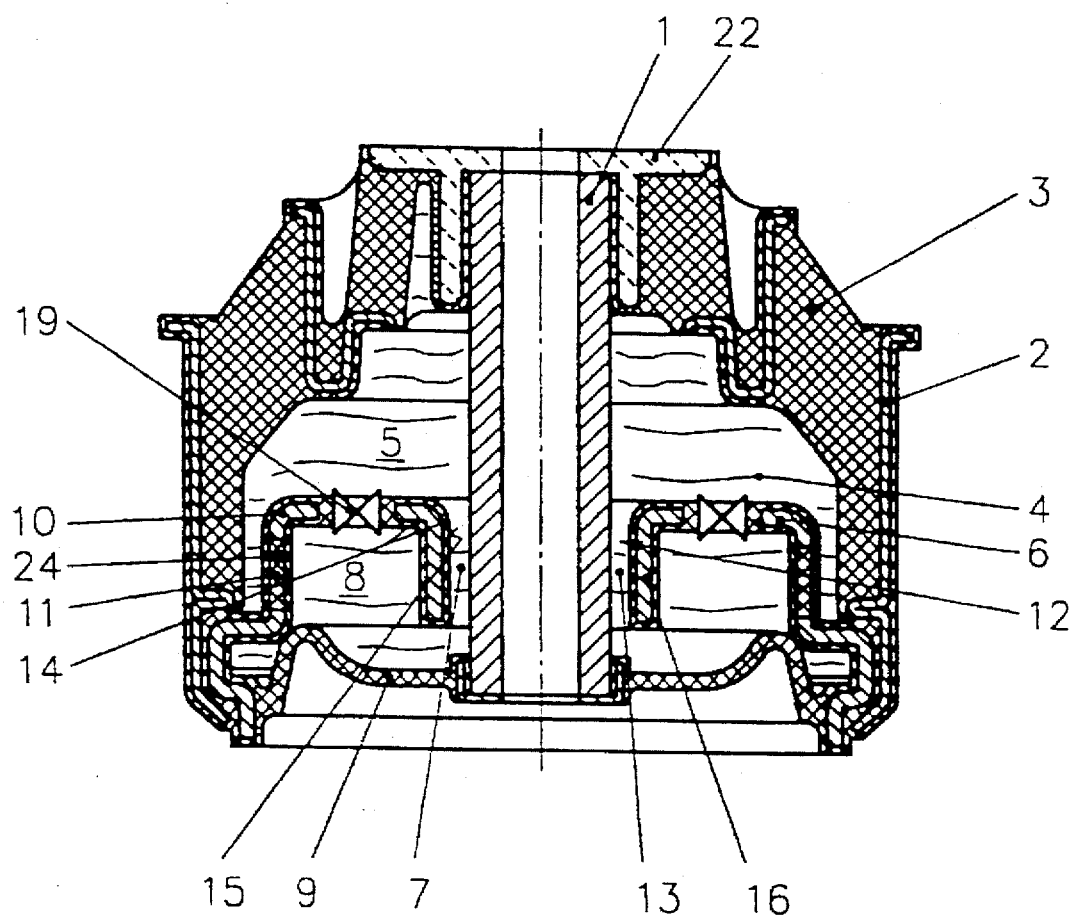
FIG. 3 shows a third embodiment in which the separating wall is provided with safety valves in order to avoid unacceptably high differential pressures between the working chamber and the compensating chamber.

FIG. 3 shows a third embodiment constructed similarly to the embodiment of FIG. 1, except having safety valves formed in the separating wall 6. In the separating wall 6, additional windows are provided in which the window membranes have a cut in the elastomeric material, the cut forming a safety valve 19.

If, for example, a rubber bearing without such a safety valve is stressed suddenly, an undesirably high pressure difference develops between the working chamber 5 and the compensating chamber 8, which could lead to damage of the rubber bearing. The annular gap 12 which forms the restrictor duct 13 has too small a cross-section to be able to direct a comparatively great amount of damping fluid from the chamber of higher pressure into the chamber of lower pressure within a short time. With the provision of a safety valve 19, in the event of undesirably high pressure differences between the working chamber 5 and the compensating chamber 8, the safety valve 19 opens and thereby makes possible a comparatively rapid reduction in pressure.

Figure 4:
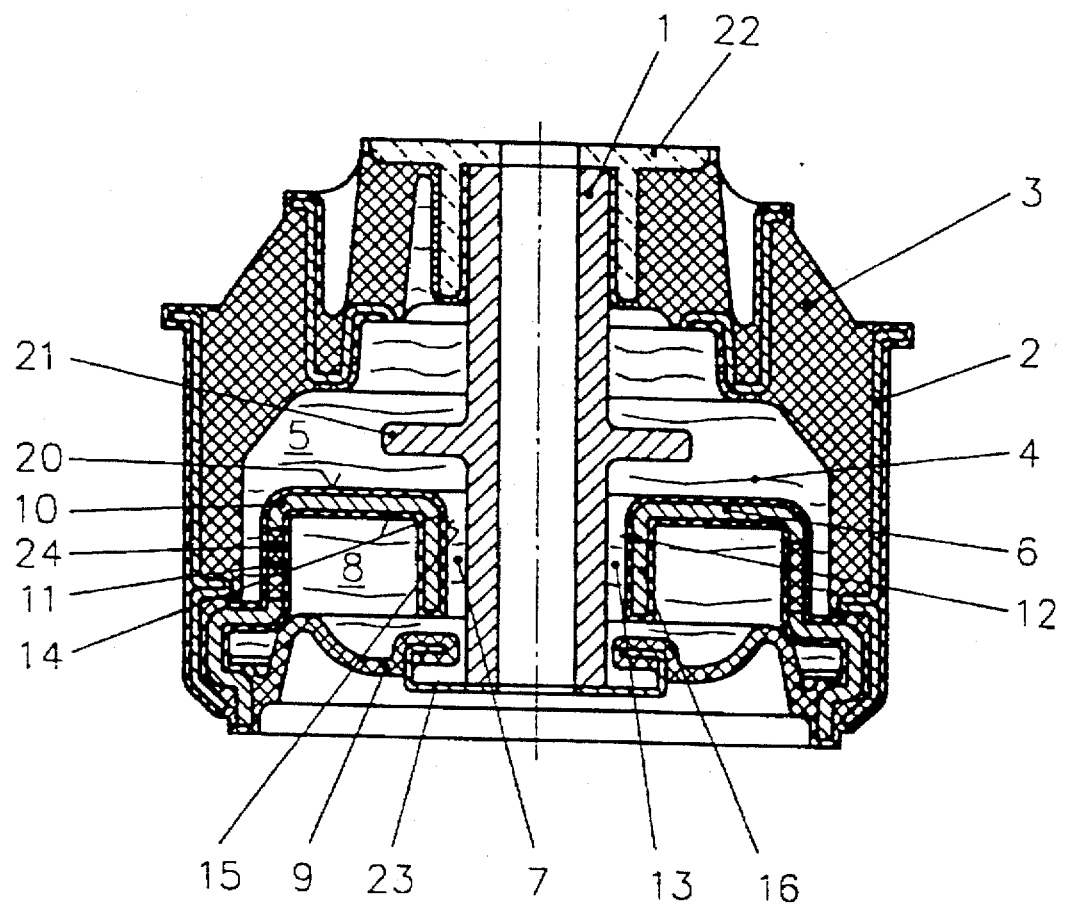
FIG. 4 shows a fourth embodiment in which, to restrict the axial excursion movements of the inner and outer supporting bodies relative to one other, a spring deflection mechanism and rebound stop mechanism are provided which are able to be brought into contact with the separating wall.

FIG. 4 shows a fourth embodiment constructed similarly to the embodiment of FIG. 1. In the embodiment shown in FIG. 4, in addition to the radial stop mechanism which restricts extreme movements of the inner and outer supporting bodies 1, 2 in the radial direction relative to one another, an axial stop mechanism 20 is provided in the separating wall 6, constructed to be brought into contact with a counter-stop mechanism 21 of the inner supporting body 1. The counter-stop mechanism 21 is designed as a spring deflection stop mechanism and is configured integrally and continuously with the inner supporting body 1.

In order to avoid excessive tensile stress within the bearing, a rebound stop mechanism 23 is provided which is able to abut against the end face of the separating wall 6 which faces the compensating membrane 9. This increases the durability of the bearing.

The compensating membrane 9, the sheath 14, and the window membranes 24 may be configured integrally and continuously with one another, as shown in each of the embodiments of FIGS. 1 through 4.

What is claimed is:

1. A hydraulically damping rubber bearing comprising:
   (a) an inner supporting body;
   (b) an outer supporting body surrounding the inner supporting body with radial clearance between the inner supporting body and the outer supporting body;
   (c) a resilient elastomeric element positioned between the inner supporting body and the outer supporting body and joining the inner supporting body to the outer supporting body;
   (d) a separating wall separating a working chamber from a compensating chamber, the separating wall comprising at least one opening allowing damping fluid to flow between the working chamber and the compensating chamber; and
   (e) a compensating membrane sealing the compensating chamber on a side facing away from the separating wall; wherein the opening of the separating wall is a centrally arranged opening which surrounds the inner supporting body with radial clearance thereby forming an annular gap which acts as a damping duct, and wherein the separating wall comprises at least one window with a window membrane made of elastomeric material positioned in the window.

2. The rubber bearing according to claim 1, wherein the separating wall is joined to the outer supporting body in a manner such that they are substantially immovable relative to each other.

3. The rubber bearing according to claim 1, wherein the separating wall is comprised of a metallic material that is deformable without the need to cut the material.

4. The rubber bearing according to claim 1, wherein an elastomeric sheath covers the separating wall, and wherein the sheath and the compensating membrane are constructed integrally and continuously with one another.

5. The rubber bearing according to claim 1, wherein the separating wall has an axial projection having a side which essentially cylindrically borders the opening, the axial projection acting as a radial stop mechanism to restrict radial movements of the inner and the outer supporting bodies relative to one another.

6. The rubber bearing according to claim 1, wherein the separating wall has at least one boundary element which is movable back and forth to isolate higher frequency vibrations.

7. The rubber bearing according to claim 6, wherein the boundary element has an substantially double-T-shaped cross-section and is snapped into place in an aperture of the separating wall.

8. The rubber bearing according to claim 6, wherein the boundary element is elastically prestressed as compared to the separating wall.

9. The rubber bearing according to claim 1, wherein the separating wall has at least one safety valve through which the damping fluid is able to flow in at least one direction.

10. The rubber bearing according to claim 1, wherein the separating wall has an axial stop mechanism which is able to be brought into contact with a counter-stop mechanism of the inner supporting body.

11. The rubber bearing according to claim 10, wherein the counter-stop mechanism is designed as a spring deflector stop mechanism and is arranged within the working chamber.

12. The rubber bearing according to claim 11, wherein the counter-stop mechanism is constructed integrally and continuously with the inner supporting body.

* * * * *